United States Patent

[11] 3,621,215

| [72] | Inventors | Heinrich Netheler;<br>Wilhelm Bergmann; Gunter Bechtler, all of Hamburg, Germany |
|---|---|---|
| [21] | Appl. No. | 821,832 |
| [22] | Filed | May 5, 1969 |
| [45] | Patented | Nov. 16, 1971 |
| [73] | Assignee | Eppendorf Geraetebau Netheler & Hinz GmbH<br>Hamburg, Germany |
| [32] | Priority | May 9, 1968 |
| [33] | | Germany |
| [31] | | P 17 73 390.3 |

[54] METHOD AND APPARATUS FOR SEQUENTIAL TESTING OF A PLURALITY OF SPECIMENS
9 Claims, 6 Drawing Figs.

[52] U.S. Cl. .................................................. 235/151.3, 235/151.35
[51] Int. Cl. ........................................................ G01d 21/00
[50] Field of Search ............................................ 235/151.35, 151.3; 424/2, 94; 250/83.3; 356/246, 244

[56] References Cited
UNITED STATES PATENTS

| 3,020,795 | 2/1962 | McKinney et al. ............ | 356/246 |
| 3,379,093 | 4/1968 | Ard .............................. | 250/83.3 X |
| 3,478,598 | 11/1969 | Nielsen ......................... | 356/246 X |
| 3,489,525 | 1/1970 | Natelson ....................... | 23/253 |

*Primary Examiner*—Malcolm A. Morrison
*Assistant Examiner*—Edward J. Wise
*Attorneys*—John C. McGregor, James Eisenman and Robert R. Strack ABSTRACT: A method and apparatus are disclosed wherein a plurality of new specimens are introduced into a closed testing cycle and the period of introduction of successive samples stand in a predetermined ratio to the duration of the testing cycle; but is different therefrom. There is continuous feeding and testing of samples sequentially and periodically, while samples are supplied and removed according to the introduction period. The apparatus for carrying out this method includes a testing plate containing a number of specimen-retaining stations. This testing plate is rotated in relation to both a measuring station and a station or stations for feeding and extracting specimens to and from the various retaining stations.

In addition, unique means are shown for recording the results of tests made in carrying out the method with the apparatus of the present invention.

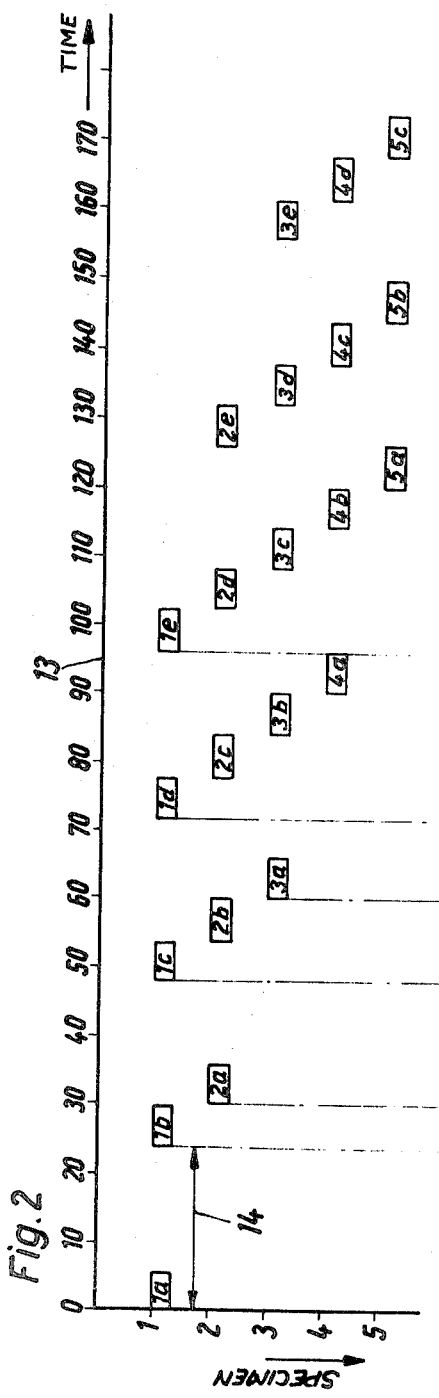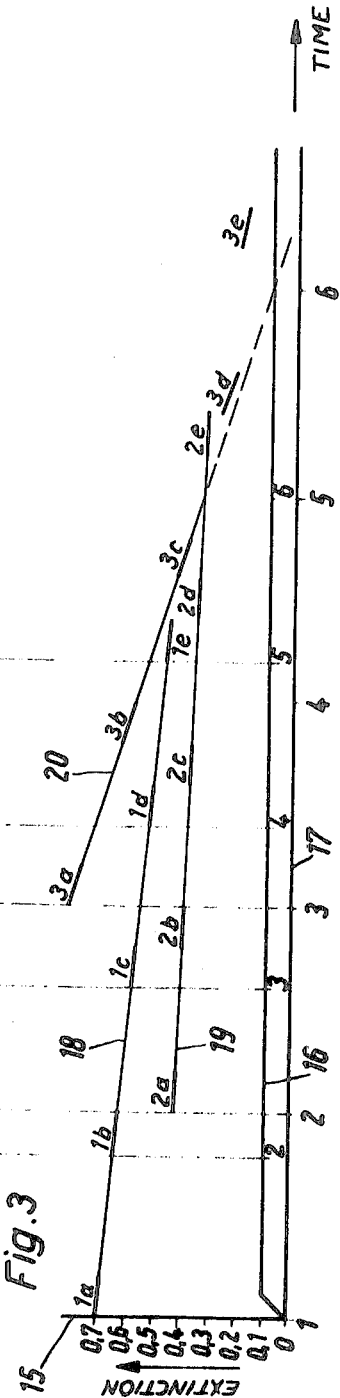

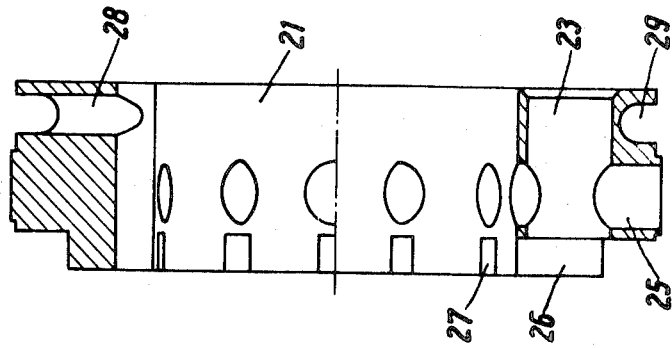
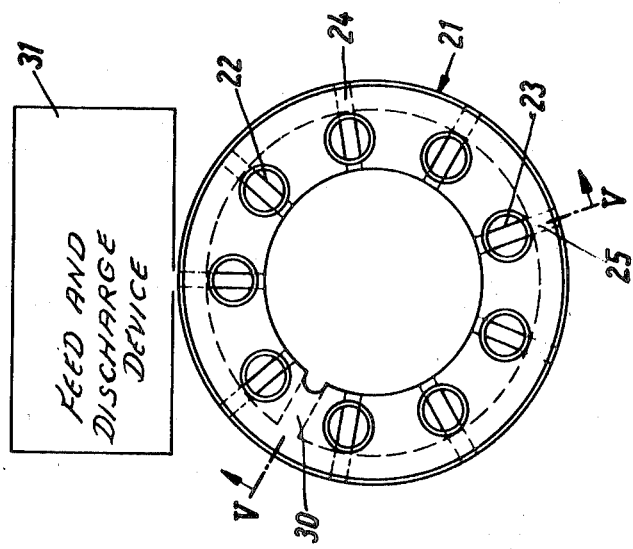

METHOD AND APPARATUS FOR SEQUENTIAL TESTING OF A PLURALITY OF SPECIMENS

BACKGROUND OF THE INVENTION

1. Field of the Invention

The invention relates generally to the testing of a plurality of specimens; more particularly, it relates to the testing of a plurality of specimens, wherein the testing is concerned with enzyme activity.

In accordance with one aspect of the invention, it is concerned with a method for the sequential testing of a plurality of specimens which are moved on a step-by-step basis over a closed circuit path, each specimen traversing the path several times, being measured once in each cycle at a testing station disposed at a fixed position on the path.

The invention also relates in another aspect to apparatus including a test plate rotatable step-by-step and convenient for carrying out the aforementioned method.

Still further, the invention relates to a charting technique whereby the results of the present method can be recorded in an analog fashion.

2. Description of the Prior Art

In most cases, the conversion of NADH to NAD is measured optically. The variation in the concentration of NADH can be determined relatively easily as a result of the fact that in the ultra violet range NADH has an absorption band at a wavelength of 340 nm, which NAD does not have. The variation of the extinction $\Delta E$ at 340 nm indicates under stable test conditions that NADH is transformed into NAD The rate of the variation, $\Delta E/\Delta t$, is a measure of the enzyme activity. In practice, measurements are carried out in a measuring vessel by starting the reaction with the addition or release of causative components. Thereafter, the extinction is recorded as a function of time. The variation of the extinction per unit time, can be recorded on a graph as a measure of enzyme activity. Normally, the operation takes several minutes at least.

With the increasing clinical-diagnostic importance of certain enzyme activities, such as in the case of myocardium and liver damage, arrangements are now provided in clinics wherein a plurality of specimens are periodically supplied to a testing apparatus. This supply of specimens occurs on a sequential basis and results in a better utilization of the apparatus. With such arrangements, for the same expenditure of time one can determine, for example, several enzyme activities instead of only one. This method, in which for example, six specimens are prepared and then measured, constitutes a partial mechanization of the measuring process.

Equipment is also known wherein the extinction is measured shortly after the start of activity and then again after a certain interval of time. In these instances the enzyme activity $c = K \times \Delta E/\Delta t$, is determined from two extinction measurements and the given time difference. This method has the shortcoming that errors due to interfering components that may take place during the progress of the reaction, will not be detected.

SUMMARY OF THE PRESENT INVENTION

It will be evident that by utilizing a continuous or a periodically interrupted recording of the extinction variations, errors of the type mentioned above, can be recognized by the fact that steepness of the recorded quantity varies while $\Delta E/\Delta t$ is constant only in a small range. The present invention is concerned with providing a complete mechanization of a measuring process of the type described above, while effecting the repeated measurement of each specimen in order to generate a linear extinction curve. This is accomplished by periodically and in succession introducing new specimens into a closed circuit path, wherein the period of introduction of successive specimens stands in a particular ratio to the duration for a complete circuit of path by the specimens, but is different therefrom. By continuous feeding and testing of the specimens, the sequence and periodical order is maintained and the specimens are supplied to and removed from the closed path after repeated testing, in accordance with an introduction period. One feature of the invention resides in the fact that at least one idle step of the cycle occurs during the introduction of a first and second specimen in the cycle.

In one preferred form of the invention, successive specimens are introduced into a closed circuit with a feed rhythm $T = (kn \pm 1)t$; wherein $t$ is the duration of time for one movement step plus one measuring interval; $n$ is the number of specimen positions in the circuit path; and $k$ is the number of full revolutions of a specimen in the path after it is introduced. With the method of this particular embodiment, it is possible to construct a simple device that can be loaded regularly in accordance with a predetermined sequence and which will permit a uniform uninterrupted yet intermittent movement, permitting the required measurements at proper intervals and also permitting removal of specimens in a proper sequence.

Such a device includes a rotatable test plate with an intermittent drive. A feed and discharge device for the specimens is employed in order to insert and remove specimens when the test plate has made a number of steps; that number being different by one step from the number of steps which correspond to one or more full revolutions of the test plate. In other words, the addition or removal of a specimen to or from the test plate takes place when the latter has executed one step more or less than corresponds to one full revolution.

As a result of the features of the invention, the test plate can be driven in relation to the test station in a step-by-step fashion without interruption, the specimens being introduced to a feed device which in turn feeds them to the test plate in the required sequence and synchronization. With the present invention and apparatus, it is possible to completely automate the processing of specimens in a certain sequence and with repeated testing procedures.

With more particularity, it will be seen that if a test plate has $n$ retainer positions, and the duration of time for one stepping movement plus one measuring interval is $t$, the time for one revolution of the plate is $n \times t$. The invention provides that the feed and discharge device is so controlled in relation to the drive of the test plate that the feed rhythm is $(kn \pm 1) \times t$. The duration of time of the specimen on the test plate, is accordingly equal to $n \times (kn \pm 1)t$. The admission of a specimen "x" relative to the beginning, that is, the admission of the first specimen, being effected at a time $t_x = x(kn \pm 1)t$, where $k$ indicates the number of full revolutions of the test plate It is advantageous to take as a basis the feed and removal devices being combined at a single station. In this situation, when the test plate is at a standstill during a measurement, additional specimens may be removed and added at the takeup and removal station. Thus, following measurement the process is continued and all retainer positions will be occupied.

As illustrated in connection with the specific embodiments of the invention disclosed hereinafter, the retainer positions may be provided with a radial passageway which extends through an annular section of a test plate. One element of the measuring equipment may be arranged within a central aperture of the test plate, at a level with the passage. Outside the test plate, another element of the measuring equipment may be disposed.

In one of the specific embodiments of the invention, a printer is provided in combination with the test plate. The invention provides that the printing mechanism is designed for a number of columns which correspond to the number of retainer positions on the test plate. Data is recorded by skipping a line after each complete cycle of the test plate, and the measured values for each specimen are listed one below the other within any one column. This greatly simplifies the evaluation of results obtained and a very clear charting is accomplished. Advantageously, the printer has a computer associated therewith which calculates the extinction difference between successive measured intervals and which possesses a memory in which the measured values for determining the difference information can be stored. During the first measurement and storage for each specimen, identification information for that specimen may be recorded and printed.

On a chart paper for analog recording, the time axis may be provided according to the invention, with two separate graduations or scales. One of the scales is correlated with the rotation period of the test plate. The second scale is correlated with the feed rhythm of the specimen, and proportioned accordingly. With this recording technique, the results of a plurality of tests can readily be seen and evaluated.

An object of the present invention is to provide improved means for sequentially testing a plurality of specimens.

Another object of the invention is to provide an improved method for charting and recording the results of tests on a plurality of specimens.

Another object of the invention is to provide improved apparatus for carrying out the sequential testing of a plurality of specimens.

Another object of the present invention is to provide an improved method and apparatus for carrying out the sequential testing of a plurality of specimens, wherein the specimens are subjected to measurement over a short period of time and are sequentially subjected to such measurements a number of times.

Another object of the invention is to provide an improved method and apparatus for measuring a plurality of specimens wherein there is a specific number of specimens and the tests to which they are subjected are one integer more or less than said specific number.

Another object of the present invention is to provide a method and apparatus for testing a plurality of specimens wherein the testing procedure is carried out with a predetermined measuring rhythm, the number of tests being greater or less than the number of specimens involved, and said measuring rhythm being uninterrupted.

Another object of the invention is to provide an improved means for displaying the results of tests upon a plurality of specimens.

A more complete and thorough understanding of the present invention and the aforedescribed objects thereof, will be understood from the following description which is made in conjunction with the drawings.

BRIEF DESCRIPTION OF THE DRAWINGS

FIG. 2 is a timing diagram depicting the repeated measurement of a plurality of specimens which are supplied in a fixed rhythm;

FIG. 3 is a chart illustrating the recordation of measurements made upon a plurality of specimens in accordance with timing diagram of FIG. 2;

FIG. 4 is a schematic illustration showing a top view of another embodiment of the invention;

FIG. 5 is a schematic illustration of a side view of the embodiment shown in FIG. 4, said side view being in section and on a larger scale.

DETAILED DESCRIPTION OF THE PREFERRED EMBODIMENT

Figure 1:
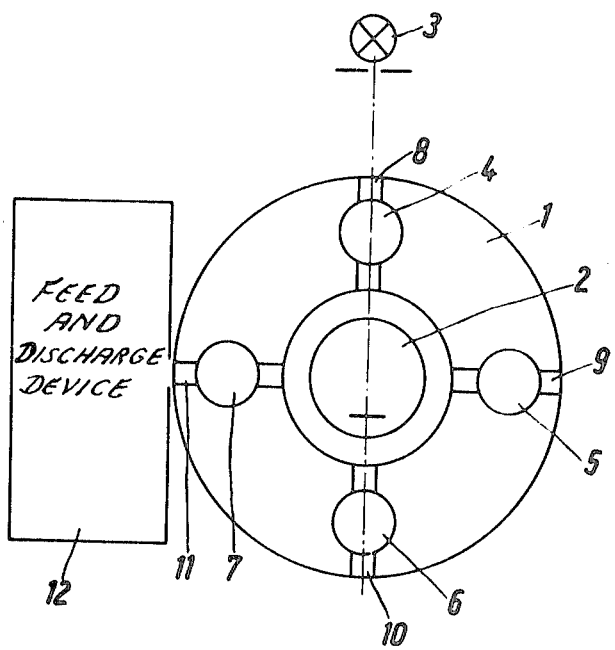
FIG. 1 is a schematic illustration showing a test plate and feed device in accordance with one embodiment of the invention.

FIG. 1 illustrates a test plate having an annular section 1 surrounding a central portion 2 in which one element of a test or measuring station is disposed. The other element 3 of the test station is located along a straight line path from the first element. For example, the test station may comprise a photometer in which element 3 is the light source and element 2 is a photocell. The test plate 1 has four retaining positions 4, 5, 6, and 7, which are uniformly distributed around the circumference of the annular section. A radially disposed passage 8, 9, 10, and 11, is associated with each of the retaining positions 4 through 7, respectively. Thus, as the test plate is rotated in 90° increments, each of the retaining positions 4 through 7 are interposed at the test station between elements 2 and 3 and the light may traverse the associated radial passage 8-11 and pass through the mounted specimen. A work station is provided in a position upstream of the test station, considering clockwise rotation of the test plate 1. For example, at retainer 7 there is provided a feed and extraction device 12 for the feeding and removal of specimens into and out of a retaining position. The sample vessels may be inserted into the retaining positions along with the material being tested. For example, the retaining positions may be apertures within which cuvettes containing specimens may be mounted.

Since the rhythm of the test plate must by synchronized with the rhythm of the feeding and discharge device, the drive means for the test plate may be located within device 12. For example, it may act upon the circumference of the annular section.

In FIG. 1, the illustrated test plate has four retainers; therefore, $n=4$. If $t$ is the duration of time required for one measurement and one stepping movement of the platter by 90° for the admission of a successive retaining position into the test station, then one full revolution with $Xn$ steps requires the time, $t \times x$. It is contemplated that five measurements are to be performed on a single specimen before it is taken out again. When this is the case, one must consider that $k \times 1$ and that the number of steps would be equal to $n+1$, and the feed rhythm is $T=5t$. In other words, the feed rhythm corresponds to five working steps of the test plate and is hence longer than one revolution of the plate which is $4t$. Under these circumstances, the second specimen is supplied to the test location only when the first sample has gone by the test station twice; or, in some cases, the second specimen is inserted on the test plate when the first specimen is in the test station for the second time. This type of operation is possible with the arrangement shown in FIG. 1. Device 12 consists, for example, of a rhythmically movable gripper that operates to introduce sample vessels and extract them. These operations can be carried out within the standing time during which another specimen is being measured in the test station.

It is also possible that only three measurements would be carried out successively on each specimen. In this stance, one would operate according to the above formula with the condition $(n-1) \times t$, that is, after the admission of a first specimen the second specimen would be supplied before the second testing of the first specimen. Utilizing apparatus of the type shown in FIG. 1, the second specimen would be introduced at retaining position 7 when the first specimen has rotated in a counterclockwise direction to the position of retainer 6. It is important that the working rhythm of the feed device 12 is different from a full revolution of the test plate.

FIG. 2 is a timing diagram showing the operation of equipment such as illustrated in FIG. 1. Under the conditions that there are four retaining positions and five measurements are to be effected, the abscissa in FIG. 2 represents time and it is divided into seconds. It is assumed that the specimens are introduced onto the measuring plate at intervals of 30 seconds. The specimens are numbered 1 through 5 and the sequence of the individual measurements made upon each specimen are indicated by the lower case letters $a$ through $e$. It is assumed that the interval required or the testing plate to move one step and permit completion of a measurement, is 6 seconds. The illustrated blocks 1$a$, 1$b$, 2$a$ etc., in FIG. 2 and the heavier lines in FIG. 3 are proportioned accordingly.

The total time required for a complete revolution of the testing plate is $n=t=24$ seconds. Consequently the feeding rhythm, again considering the factor $k=1$, is $T=(4+1) \times 6=30$ seconds. It will be appreciated that in FIG. 2 the blocks 1$a$ and 2$a$ are in fact offset in relation to one another by 30 seconds. Under these conditions, a specimen is retained on the testing plate for five measurements or for $4(4+1) \times 6=120$ seconds. Utilization of this formula is valid when the feed and discharge station is combined at a single location as is the case in FIG. 1 with respect to device 12. Thus, the first specimen is removed after five measurements in accordance with the above description at a location at which the fifth specimen is inserted into the vacated retaining position. FIG. 2 illustrates that the fifth specimen appears as block 5a after the elapse of 120 seconds.

It is obvious that the feed and discharge stations may be separated. The discharge device could be provided at any desired location, such as at the illustrated retaining positions 5 or 6 in FIG. 1. Thus, specimen 1 can be discharged on the next step after the final measurement 1e is made. This may occur, for example, when the measurement 2d on specimen 2 is being carried out. On the other hand, specimen 1 may be discharged at retaining position 6, when the measurement c of specimen 3 is being performed. At any rate, it will be seen that the described operation results in a system wherein, after 20 steps or time durations t, a first sample, 1, is in the fifth cycle and has completed five cycles, if the feed and discharge device is arranged in the same location, such as 12 in FIG. 1.

FIG. 3 illustrates the presentation of test results on a chart. The ordinate of the graph shown in FIG. 3 is divided into value variations of the extinction. Two abscissa are shown as time axes 16 and 17. In fact, the magnitude of the time scale of FIG. 3 is the same as that of FIG. 2. For convenience, however, the divisions or graduations of the x-axes in FIG. 3 are labeled differently. The time axis 17 is divided according to the feed rhythm T, or the period of introduction. It will be recalled that this has been assumed to be 30 seconds. The time axis 16 is divided in accordance with the time duration $t \times n$, that is, the measuring rhythm is indicated by the 24 second interval depicted by arrow 14 in FIG. 2. Time axis 16 is specifically pertinent only relative to specimen 1 and shows the difference formation $\Delta E/\Delta t$. It will be seen that there results the division on the time axis 17 which is the starting point for a new division series at the time axis 16, which indicates the extinction values for the following samples in their positions. It will be noted that at the location of measurement of $a$, a difference value is still not yet available. In a manner described hereinafter, this measuring position can be best utilized for the reproduction of a specimen identification.

Assuming the use of a chart paper which moves at a normal speed, the measured value can be generated as an analog value and in this situation, the extinction can be recorded on a linear scale. The two time axes with different graduations then facilitate evaluation. The sections of the recorded curves corresponding to a single specimen, can be connected so that the linearity of the curve is easily verified. For the specimen 3, as depicted in FIG. 3, there is strong activity. As a result of this, the last two measurement indications, 3d and 3e, are no longer within the linear range and therefore would not be used for the evaluation. It will be noted that the curves produced by the connecting lines are marked 18 for specimen 1, 19 for specimen 2, and 20 for specimen 3.

FIGS. 4 and 5 illustrate a preferred form of test platter for larger numbers of specimens. As shown, test platter 21 is annular in shape. It has nine retainer positions 22, 23, etc., at which there are provided radial passages, 24, 25, etc., through which measurements may be effected. Each of the retainer positions may in fact, by apertures. Corresponding with each retainer position, on one side of the annular section, there is a ratchet notch 26, 27. A ratchet element connected with the drive means (not shown) engages the ratchet notches and securely and positively retains the test plate in rigid position during measurements.

FIG. 5 also illustrates that surrounding the annular section there is a groove 28 which is adapted to receive a heating element 29. A passage 30 is provided into the inner section where junction means or feed means for the heating element may be disposed. This heating element is provided in order to insure a uniform temperature control on the measuring plate.

As described an illustrated in connection with FIG. 1, the elements of a testing station will be disposed within the center of the annular section of the test plate and also external thereto, so that the radial passages 24, 25, etc., provide a path for the measuring beam when the specimen is located at the measuring station. Device 31 is provided as a feed and discharge device.

Figure 6:
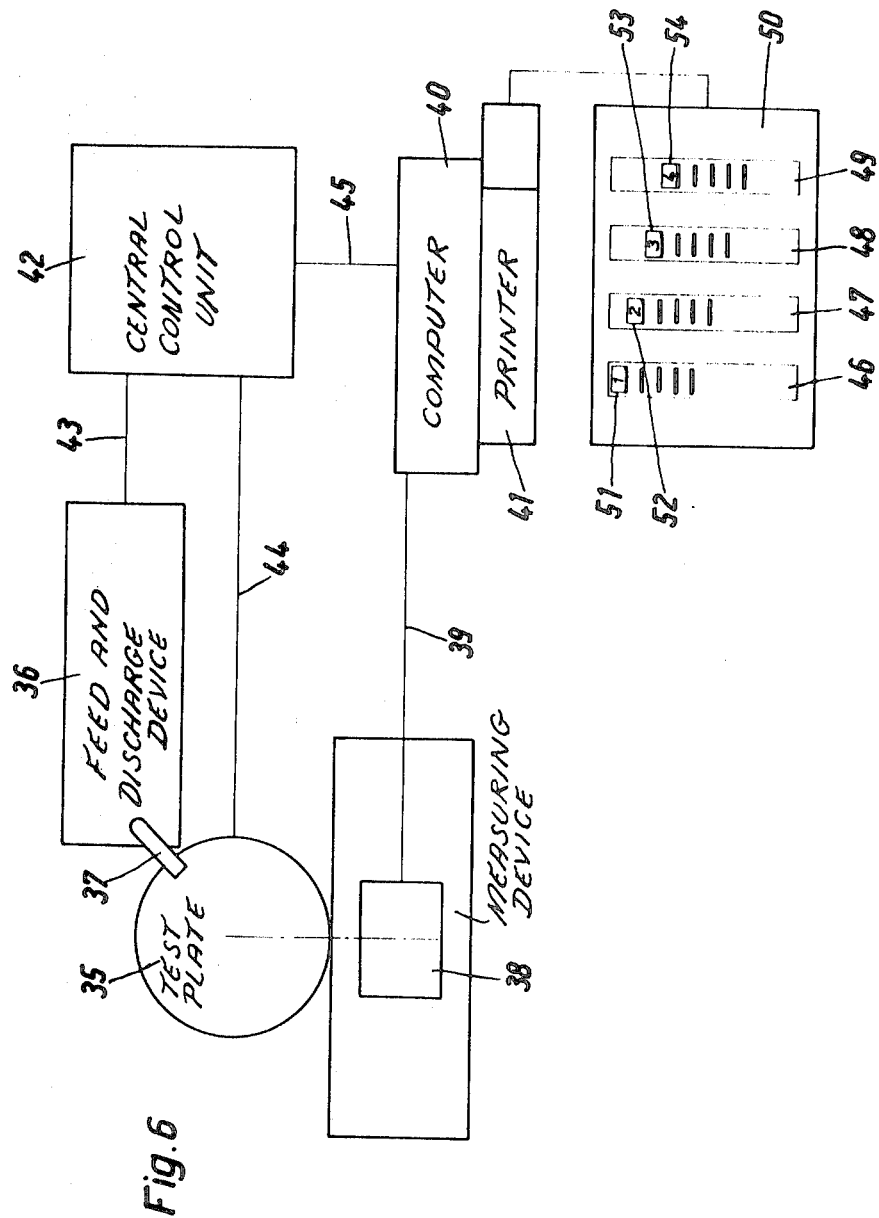
FIG. 6 is a schematic block diagram illustrating a system utilizing the apparatus of the present invention and carrying out the method thereof, said system including means for developing a recording chart in accordance with another aspect of the invention.

A typical system utilizing the present invention is illustrated in FIG. 6 wherein there is disclosed a test plate 35 next to a feed and discharge device 36. Between these elements, there is a transfer device 37 for transferring the specimens to and from the feed and discharge device 36. The plate 35 is adjacent to and includes the aforementioned measuring device which is depicted by element 38. Element 38 is connected via a functional connection 39 with a computer 40, which in turn actuates a printer 41. All parts are under the control of a central control unit 42 which establishes the aforedescribed work rhythms interdependently via driving connection 43, 44, and 45. The specific drive means for the test plate are engaged, in a manner not illustrated in detail, at the annular section; or respectively, drive means that are used for supporting the test plate. The lower right hand portion of FIG. 6 illustrates a manner in which the printer 41 is advantageously utilized as a numeral printer which records data in columns corresponding to the number of retainer positions on the test plate 35. In this instance, and in accordance with the device of FIG. 1, the number of retainer positions is four. The differences $\Delta E/\Delta t$ detected during measurements a–1, a–c, a–, and a–e, are developed by the computer 40 from the output derived from the extinction measuring unit 38.

At a time when the measured value $a$ is being obtained (assuming a total of $n+1$ measurements) there is still no difference path available. At this position on the printed chart 50, there is therefore recorded, or printed, an identification of the specimen involved. This arrangement permits one to provide four vertical columns 46, 47, 48, 49, on the chart paper 50. The beginning of each column is offset vertically in relation to one another as a result of the graduations of the time axis 17 illustrated in FIG. 3. Each sample is first entered and identified by a data block, 51, 52, 53, 54, and in the remainder of the vertical columns there is then written four measured differential results. As the value of the measurement is stored, the specimen identification can be printed without an additional working step of the testing device.

The form of digital documentation disclosed hereinabove, makes it possible to carry out control of the measured values of a patient's specimens with minimum concentration, and permits carrying out the documentation with a common start-stop carriage printer.

Several embodiments of the invention have been shown and described. It will be appreciated that with this disclosure in hand, those skilled in the art will be aware of modifications that can be made without departing from the spirit and teachings of this disclosure All such modifications as come within the scope of the present invention, are intended to be covered by the following claims.

What is claimed is:

1. A method for sequentially testing a plurality of specimens comprising intermittently and continuously stepping a predetermined number of said specimens past a testing station, each specimen being measured once in each complete cycle of said specimens past said testing station; periodically introducing new specimens in succession into the cycle, the period of introduction bearing a particular ratio to the duration of a complete cycle and being different therefrom; and continuously feeding, testing, and removing said specimens after a plurality of measurements while maintaining the sequence and order.

2. A method according to claim 1, including introducing successive specimens into the cycle with a feeding rhythm $T=(kn\pm 1)t$, where $t$ is the sum of the time duration for one step plus the required time for making said measurement, $n$ is said predetermined number, and $k$ is the number of complete cycles a specimen traverses.

3. Apparatus for sequentially testing a plurality of specimens, comprising rotatable plate means having a plurality of specimen retaining means uniformly distributed about the circumference thereof, one of said retaining means being positioned adjacent a testing station, an intermittent drive means for successively positioning said retaining means at said testing station, and feed and discharge means for supplying and removing specimens to and from said plate means when it has made a number of steps that is different by one integer from the number of steps required to effect a complete revolution of said plate means.

4. Apparatus according to claim 3, wherein said plate means has $n$ retaining means and the time between each successive positioning of a specimen at said testing station is $t$, said feed and discharge means being synchronized with said drive means to effect a feeding rhythm $(kn\pm1)t$; and being operative to retain a specimen on said plate means for a time $n(kn\pm1)t$, and to supply a specimen $x$ relative to the supply of a first specimen, at a time $t_x=x(kn\pm1)t$, where $k$ is the number of complete revolutions of said plate means.

5. Apparatus according to claim 3, wherein said plate means comprises an annular section, said retaining means being apertures within said annular section, and radial passages extending from the central opening of said plate means through each of said apertures; and wherein measuring element are positioned within said control central opening and at said testing station adjacent the circumference of said annular section, said measuring elements having a line-of-sight through said radial passages.

6. Apparatus according to claim 5, comprising a ratchet element associated with each retaining means position, and a matching ratchet element connected with said drive means and adapted to engage with one of said first-mentioned ratchet elements when the plate means is not rotating.

7. Apparatus according to claim 5, wherein said annular section includes a groove for holding a heating element.

8. Apparatus according to claim 3, in combination with a printer for the recording of the measured values, comprising a printing mechanism operative to print in a number of columns which corresponds to the number of retaining means on said plate means, and controlled in synchronism with said intermittent drive means to skip a line after each full revolution of said plate means, said printer being controlled to print measured values for each specimen listed in a column one below the other.

9. Apparatus according to claim 8, including computing means supplied by said testing station for storing measured values and calculating the difference between successive measured values from a specimen, said computing means being operative to control said printing mechanism whereby during storage of the first measured value from a specimen, a specimen identification is printed in the appropriate column.

* * * * *